United States Patent
Banks et al.

(10) Patent No.: US 7,057,508 B2
(45) Date of Patent: Jun. 6, 2006

(54) APPARATUS AND METHOD FOR PROVIDING LOCAL GEOGRAPHIC INFORMATION TO REMOTE COMMUNICATION DEVICES

(76) Inventors: Phillip Brendan Banks, 16 Ariadne Crescent, Modbury Heights, South Australia 5092 (AU); Kevin James Soper, 2 Doradus Avenue, Hope Valley, South Australia 5090 (AU); Luceille Outhred, 19 Koonga Ave., Prospect SA 5082 (AU)

( * ) Notice: Subject to any disclaimer, the term of this patent is extended or adjusted under 35 U.S.C. 154(b) by 34 days.

(21) Appl. No.: 10/655,417

(22) Filed: Sep. 2, 2003

(65) Prior Publication Data
US 2005/0190081 A1    Sep. 1, 2005

Related U.S. Application Data

(63) Continuation of application No. PCT/AU02/00219, filed on Mar. 1, 2002.

(30) Foreign Application Priority Data
Mar. 1, 2001    (AU) ..................... PR3445

(51) Int. Cl.
*G08B 1/08*    (2006.01)
(52) U.S. Cl. .................. 340/539.13; 340/539.11; 340/539.2
(58) Field of Classification Search .......... 340/539.13, 340/539.1, 539.11, 539.16, 539.2; 455/403, 455/404.2
See application file for complete search history.

(56) References Cited

U.S. PATENT DOCUMENTS

| 4,888,709 | A | | 12/1989 | Revesz et al. |
| 5,250,789 | A | | 10/1993 | Johnsen |
| 5,287,266 | A | | 2/1994 | Malec et al. |
| 5,295,064 | A | | 3/1994 | Malec et al. |
| 5,646,616 | A | | 7/1997 | Komatsu |
| 5,708,782 | A | | 1/1998 | Larson et al. |
| 5,821,513 | A | | 10/1998 | O'Hagan et al. |
| 5,880,449 | A | | 3/1999 | Teicher et al. |
| 5,933,813 | A | | 8/1999 | Teicher et al. |
| 6,021,371 | A | * | 2/2000 | Fultz .......................... 701/200 |
| 6,148,261 | A | * | 11/2000 | Obradovich et al. ........ 701/208 |
| 6,266,615 | B1 | * | 7/2001 | Jin ............................. 701/213 |
| 6,405,123 | B1 | * | 6/2002 | Rennard et al. ............ 701/200 |
| 6,654,683 | B1 | * | 11/2003 | Jin et al. .................... 701/207 |
| 6,728,531 | B1 | * | 4/2004 | Lee et al. ................... 455/419 |
| 6,829,475 | B1 | * | 12/2004 | Lee et al. ................... 455/419 |

FOREIGN PATENT DOCUMENTS

| EP | 816802 A2 | 1/1998 |
| JP | 06-295397 | 10/1994 |
| WO | WO 99/17132 A1 | 4/1999 |
| WO | WO 01/27899 A1 | 4/2001 |

* cited by examiner

*Primary Examiner*—Toan N. Pham
(74) *Attorney, Agent, or Firm*—Francis Law Group

(57) ABSTRACT

An apparatus for the display of geographical information comprising a remote communication device having a display and a global positioning system adapted to provide information about the position of the device and transmit it to a remote location; and a remote database having geographical data, wherein the communication device transmits its current position to the database and the database transmits geographical information in relation to that position to the communication device, the information subsequently being displayed on the communication device display.

16 Claims, 4 Drawing Sheets

APPARATUS AND METHOD FOR PROVIDING LOCAL GEOGRAPHIC INFORMATION TO REMOTE COMMUNICATION DEVICES

This application is a continuation of Application No. PCT/AU02/00219, filed Mar. 1, 2002, which claims priority from Australia Application No. PR3445, filed Mar. 1, 2001.

The present invention relates to an apparatus and method for providing to a user details of the local area within which they are located and/or have been located. In particular the present invention provides for an apparatus that enables a user to be able to store and update their current geographical information and display it in a usable format.

BACKGROUND OF THE INVENTION

It is well known to provide vehicles and the like with geographical information apparatus such as computers and hand held equipment with navigation systems, that provide geographical information to the driver, or user such as road maps. The user generally programmes their location and the navigation system, which has different maps stored within, provides the user with a map in relation to their location. In addition, some navigation systems work on the principle of using starting and finishing co-ordinates whereby a driver and/or user enters the relevant co-ordinates and the navigation system provides the driver with information on how to reach their final destination.

Those navigation systems, which are built into vehicles, lack portability and which are not removable from the vehicle and are therefore limited in use as they cannot accompany the user out of the vehicle. A user leaving the vehicle and moving some distance from it may become disoriented and thus not be entirely sure of their location done.

Portable navigation systems, which may be contained within a laptop computer, may address some of these portability issues but are cumbersome and not robust or "ruggedised". It is therefore limited in its portability and quite useless to hikers, backpackers or others in a harsh environment.

Handheld navigation systems may be interfaced with a computer but the problems outlined above are not resolved.

Other handheld navigation systems may mate with different technologies such as digital cameras, PDAs and handheld personal computers and the like but this necessitates the user carrying 2 pieces of equipment for information to be usefully displayed on a relatively large display screen."

Some navigations systems manual or electronic may incorporate a form of compass and may require local information or a system of triangulation to be able to provide accurate geographical data in relation to the position of the user and/or vehicle.

In addition, maps continually change and it is difficult, time-consuming and even not practicable for systems, such as those mounted in vehicles, to be continually updated. Not only would this take time, but would be an additional expense.

Even if some of the systems are able to display the information, the displays themselves are fixed in a spatial position and may not at times be easily viewed by the user. Further still, the map provided cannot generally be displayed at alternative sites. It is therefore envisaged that the present application may be used in conjunction with remote display device the subject of a co-pending application, Australian patent application No. PR3068 entitled "A remote communication device with image projection capabilities".

It is an therefore an object of the present invention to propose an apparatus and a method for the provision of geographical data, such as maps, or an apparatus and method that provides a useful alternative to those currently known or at least provides the public with a useful alternative.

SUMMARY OF THE INVENTION

Therefore in one form of the invention there is proposed an apparatus for the display of geographical information including:

a remote communication device including a display and having a global positioning system adapted to provide information about the position of said device and transmit it to a remote location;

a remote database including geographical data wherein said device transmits to said database its current position and said database transmits to said device geographical information in relation to that position, said information subsequently displayed on said device display.

Advantageously, said global positioning system is both removable and attachable and may be used on different remote communication devices.

Preferably said communication device is a mobile or cellular phone.

Advantageously said geographical information may be provided at different resolution levels, said level able to be controlled by the user.

Advantageously said device includes the ability to send to the database co-ordinates other than its current position to be able to display geographical information about said other co-ordinates.

Preferably, said device includes the ability to project said geographical information away from said device. At the same time the device may very well display said information on the display.

Advantageously the remote communication device may have its geographical map data, or any other relevant data, upgraded with Smart Media Cards.

Advantageously Smart Media Cards within the remote communication device may be upgraded by digital transmission.

Advantageously the remote communication device may have its geographical map data upgraded by transmission of various points of interest commercial or otherwise."

In preference said map data may be updated at set pre-determined periods of time.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
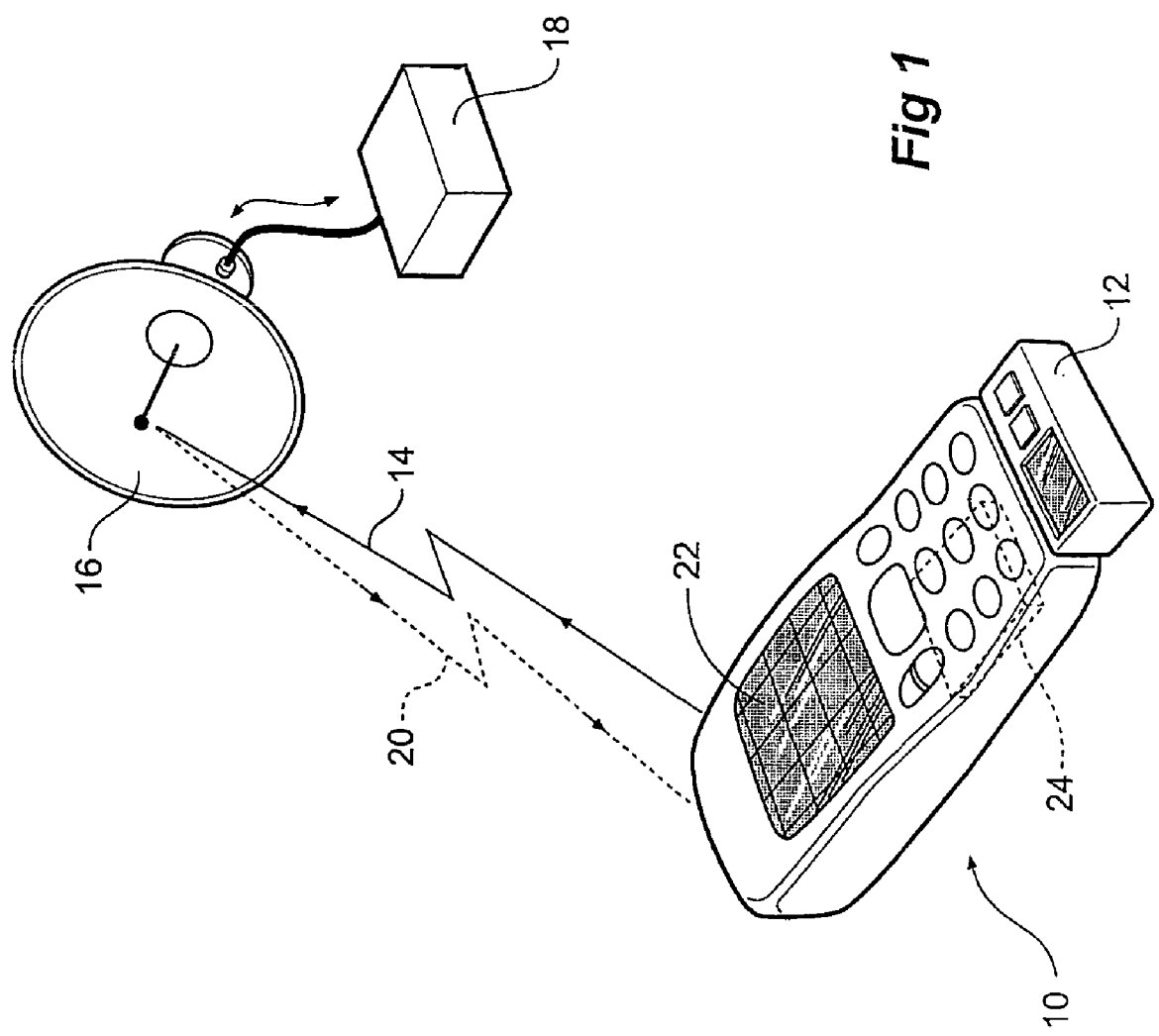
FIG. 1 is an illustration of the map-providing device according to a first embodiment of the present invention.

Thus there is shown in FIG. 1 a remote communication device such as mobile phone 10. The mobile phone has integrally attached to it a location device 12 that is able to calculate its position and provide the phone information as to its location. Such information may be calculated by the use of the well-known Global Positioning Satellites system (GPS) that is able to provide the physical location of the device within a few meters. However it is to be understood that other positioning systems may equally well be used.

Since the apparatus knows or can calculate where it is located, the remote communication device then transmits a signal 14 to an antenna 16 providing the co-ordinates as to where the device is located. The antenna receives that information and sends it to a central database 18. The central database then processes that information finds the appropriate geographical data or maps that corresponds to that location. That information is then and relayed back to the communication device through the antenna 16, signal 20 providing the graphical data in relation to the area where Is located the communication device. That map can then be displayed on display 22 that is generally found on remote communication devices such as mobile or cellular phones.

The apparatus may be adapted so that the information provided by the central database is updated every predetermined period of time. For example it may be desired that the information be updated every 30 seconds or it may be desired that the information be updated every 10 minutes.

The advantage of the present system is that the remote communication device knows its exact position. It then is able to display to the user a geographical map surrounding that exact position.

Remote communication devices generally do not have the capability to store large amounts of information. Accordingly the use of an off-site database that is able to store significantly more data, or even access to it, enable the maps that are ultimately displayed to the user to be of very good quality and high resolution.

Figure 2:
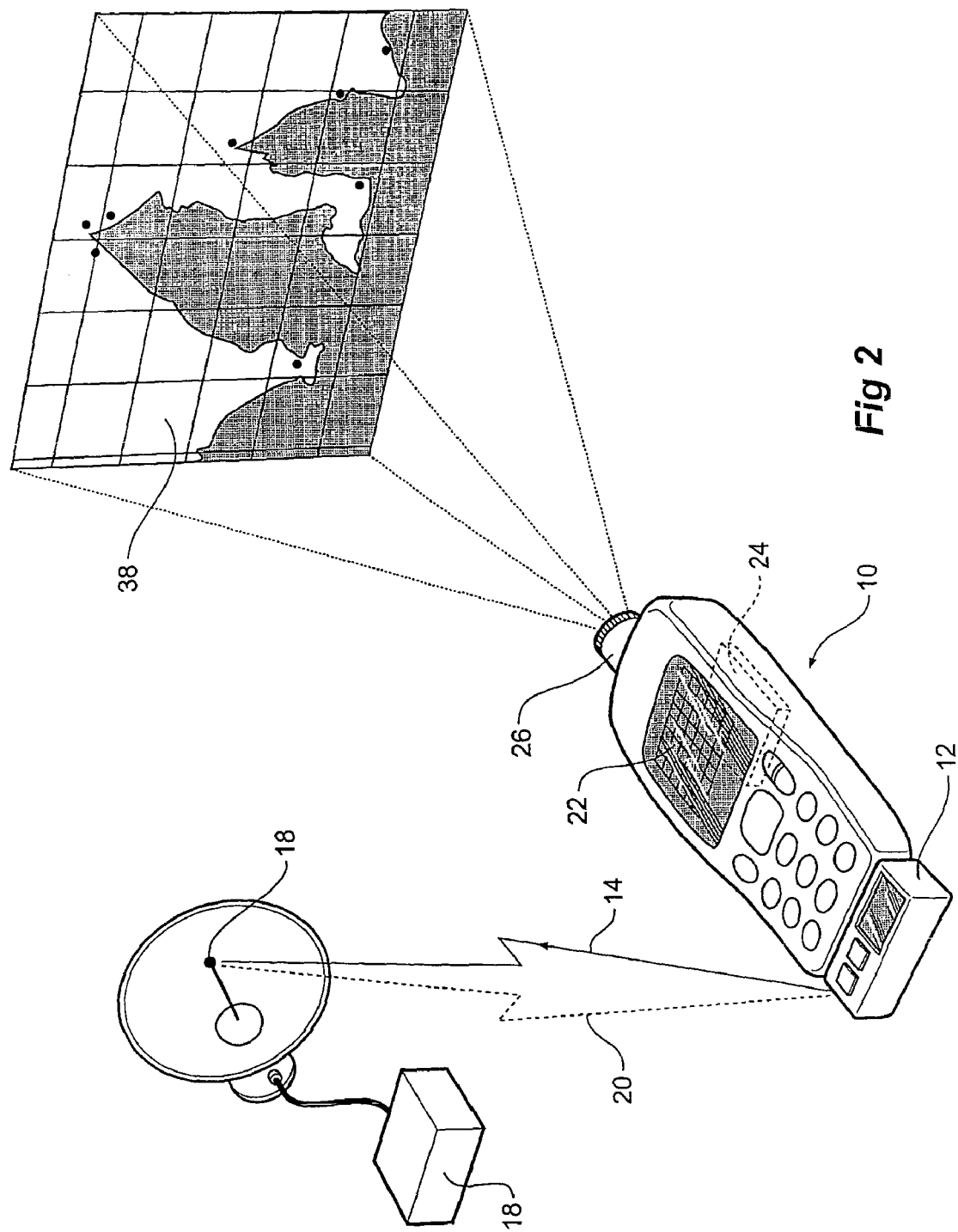
FIG. 2 is an illustration of a map-providing device according to a second embodiment of the present invention.

FIG. 2 shows a further embodiment where the present invention is combined with a remote communication device that has the capability to project the information away from the remote communication device. The present applicant in Australian patent application referred to above has described such a device. In brief, the remote communication device, such as a mobile phone, includes an internal LCD 24 that projects an image through a lens system 26 so as to project the displayed image 28 away from the phone and typically onto a display screen. Since such devices can be manufactured with a large number of pixels, the resolution of the data is of very good quality indeed. Thus the image may be displayed both on display screen 22 and at a screen spatially away from the device.

Figure 3:
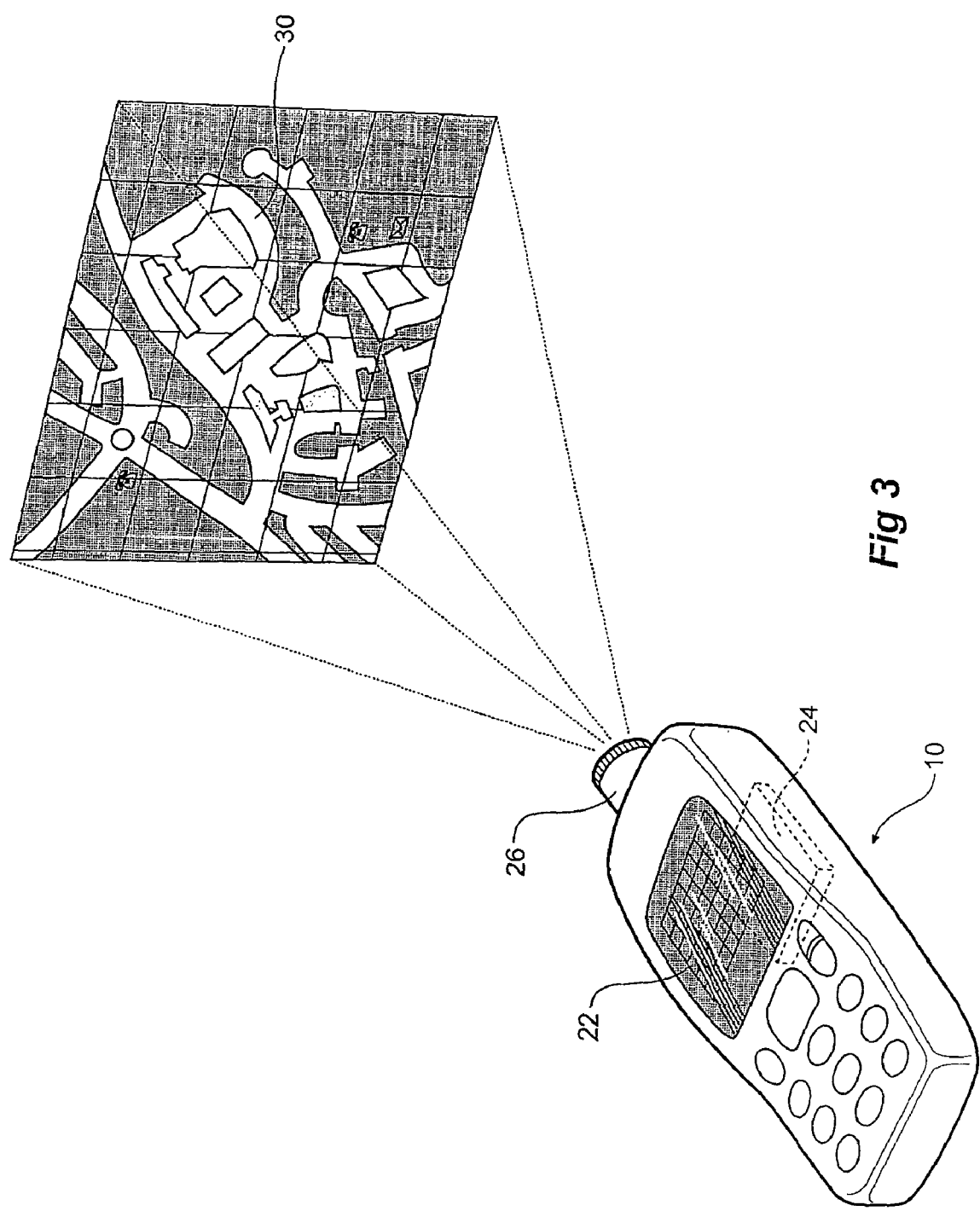
FIG. 3 is an illustration of a map providing device according to a third embodiment of the present invention.

The above two embodiments envisage a location positioning component that is adapted to be attachable to an existing remote communication device such as a mobile phone. Such a device may therefore be removable from any one phone and attachable to another. Obviously this would require a universal connection adapter for different phones. Alternatively, and as illustrated in FIG. 3, the positioning system may very well be integral within the phone.

It is to be noted that the device may provide data of different resolution. Thus whilst a global map is shown in FIG. 2, the device may be used to display much more detail such as a street directory 30.

Other advantages may equally well be present. For example whilst the present system included the ability to provide geographical information as to the current location of the phone, it may also be possible to be able to enter specific co-ordinates into the device so as to display a map of a different area.

Thus one can see that the present invention provides for a device that is able to provide detailed geographical information in relation to the area where the device is located, the device then preferably includes a positioning system that is adapted to project that image onto a suitable surface such as a screen or even a wall.

Figure 4:
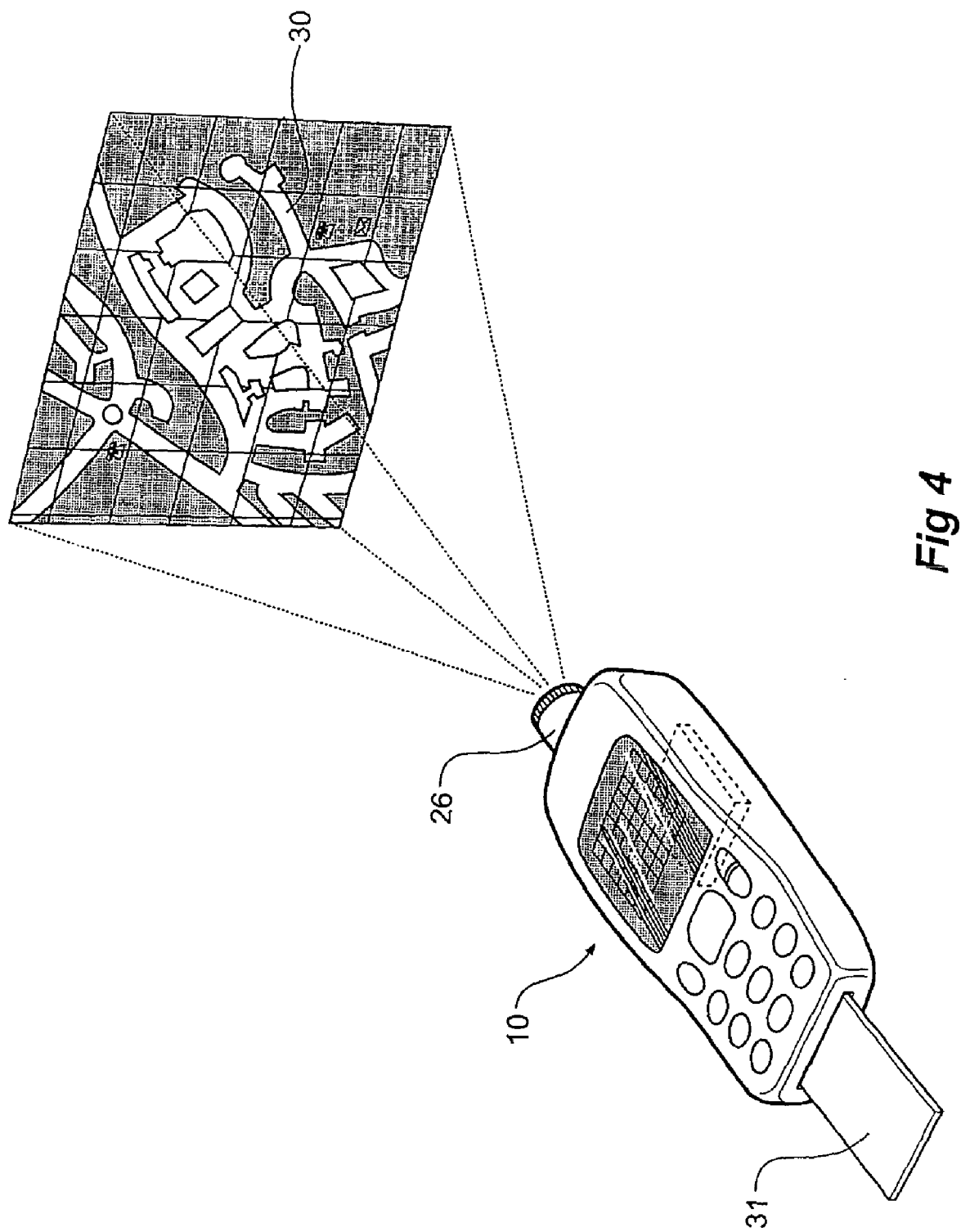
FIG. 4 is an illustration of a Smart Media Card being inserted into an embodiment of the present invention.

Accordingly one can understand that the user can personally take the device of the present invention to a different location, not just a vehicle. The portability and the ability of the device to project the data or the map onto a suitable surface area overcome many of the problems of existing navigation systems. Further, the data may be both contained within the device via Smart Media Card as illustrated in FIG. 4 or may be not contained within the device itself but remotely accessible. This means that the data is updated at a single site and that the individual devices do not need to be updated. Accordingly, various features of interest may be provided in conjunction with the different maps for the appropriate time. One example of this is where a certain area or town may be having a festival or the like. As soon as the device downloads a new map it may also include other information such as activities in the area that the user is in. Other Information may include details about accommodation, restaurants, events, place and things to see etc.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. An apparatus for the display of geographical information, comprising:
    a remote communication device having a display and a global positioning system adapted to provide information about the position of said communication device and transmit said position information to a remote location, said communication device further including a lense system and an image projection system adapted to project geographical information through said lense system to an external display medium, said external display medium being adapted to receive and display said geographical information thereon; and
    a remote database having geographical data, said remote database being adapted to receive said position information from said communication device, said remote database being further adapted to transmit said geographical information in relation to said communication device current position to said communication device.

2. The apparatus for the display of geographical information of claim 1, wherein said global positioning system is both removable from and attachable to said remote communication device and may be used on different communication devices.

3. The apparatus for the display of geographical information of claim 1, wherein said communication device comprises a mobile phone.

4. The apparatus for the display of geographical information of claim 1, wherein said geographical information is provided at different resolution levels, said resolution levels being user controlled.

5. The apparatus for the display of geographical information of claim 1, wherein said communication device is adapted to send co-ordinates other than said communication device's current position to said database to be able to display geographical information about said other co-ordinates.

6. The apparatus for the display of geographical information of claim 1, wherein said communication device is adapted to display said geographical information on said communication device display.

7. The apparatus for the display of geographical information of claim 6, wherein said communication device substantially simultaneously displays said geographical information on said communication device display.

8. The apparatus for the display of geographical information of claim 6, wherein said communication device is adapted to substantially simultaneously project said geographical information to said external display medium and display said geographical information on said communication device display.

9. The apparatus for the display of geographical information of claim 1, wherein said communication device is upgradable using Smart Media Cards.

10. The apparatus for the display of geographical information of claim 9, wherein said Smart Media Cards are upgradable by digital transmission.

11. The apparatus for the display of geographical information of claim 1, wherein said communication device includes geographical map data, said geographical map data being upgradable by transmission of selected information.

12. The apparatus for the display of geographical information of claim 11, wherein said geographical map data can be updated at set pre-determined periods of time.

13. The apparatus for the display of geographical information of claim 1, wherein said communication device comprises a cellular phone.

14. The apparatus for the display of geographical information of claim 1, wherein said display medium comprises a display screen.

15. A system for displaying geographical information, comprising:
   a display medium;
   a remote communication device having a display and a global positioning system adapted to provide information about the position of said communication device and transmit said position information to a remote location, said communication device further including a lense system and an image projection system adapted to project geographical information through said lense system to said display medium, wherein said geographical information is visually displayed on said display medium; and
   a remote database having geographical data, said remote database being adapted to receive said position information from said communication device, said remote database being further adapted to transmit said geographical information in relation to said communication device current position to said communication device.

16. The system of claim 15, wherein said display medium comprises a display screen.

\* \* \* \* \*